(12) United States Patent
Sumida

(10) Patent No.: US 11,158,985 B1
(45) Date of Patent: Oct. 26, 2021

(54) HDMI USB COMBINATION CORD

(71) Applicant: E-filliate, Inc., Rancho Cordova, CA (US)

(72) Inventor: Wesley K. Sumida, Fair Oaks, CA (US)

(73) Assignee: E-filliate, Inc., Rancho Cordova, CA (US)

(*) Notice: Subject to any disclaimer, the term of this patent is extended or adjusted under 35 U.S.C. 154(b) by 74 days.

(21) Appl. No.: 16/743,733

(22) Filed: Jan. 15, 2020

Related U.S. Application Data

(60) Provisional application No. 62/792,645, filed on Jan. 15, 2019.

(51) Int. Cl.
*H01R 27/00* (2006.01)
*H01R 31/06* (2006.01)
*H01R 24/62* (2011.01)

(52) U.S. Cl.
CPC ............ *H01R 31/06* (2013.01); *H01R 24/62* (2013.01)

(58) Field of Classification Search
CPC ........ H01R 13/72; H01R 31/06; H01R 11/24; H01R 25/003; H01R 27/00; H01R 24/62; B61G 5/10; G01V 1/201
USPC .................................. 439/501–506, 623, 624
See application file for complete search history.

(56) References Cited

U.S. PATENT DOCUMENTS

| | | | | |
|---|---|---|---|---|
| 4,846,697 A * | 7/1989 | Rodgers | .................. | B60D 1/62 439/35 |
| 5,149,277 A * | 9/1992 | LeMaster | ............... | H01R 25/00 439/207 |
| 5,971,799 A * | 10/1999 | Swade | ................ | B60R 16/0207 439/502 |
| 6,120,327 A * | 9/2000 | O'Brien | .................. | B29C 44/12 174/72 A |
| 6,283,789 B1 * | 9/2001 | Tsai | ........................ | H01R 27/02 439/502 |
| 6,733,328 B2 * | 5/2004 | Lin | ........................ | H02G 11/02 439/501 |
| 6,746,273 B1 * | 6/2004 | Liu | .......................... | H04L 12/10 439/502 |
| 6,979,223 B2 * | 12/2005 | Chen | .................... | H01R 13/641 439/490 |
| 7,004,787 B2 * | 2/2006 | Milan | .................... | H01R 27/00 439/502 |
| 7,419,393 B2 * | 9/2008 | Milan | .................... | H01R 31/06 439/171 |

(Continued)

*Primary Examiner* — Thanh Tam T Le
(74) *Attorney, Agent, or Firm* — Heisler & Associates

(57) ABSTRACT

A wireless streaming receiver or other signal input source is coupled to an HDMI slot on a television through a combination cord which includes male and female HDMI connectors at opposite ends of a hybrid cable segment. An HDMI conductor bundle extends along this hybrid cable segment between these HDMI connectors, to couple the wireless streaming receiver to the HDMI slot on the television. The combination cord also includes first and second USB cable segments extending from near each of the HDMI connectors. These USB cable segments extend to either a USB slot on the television to receive power therein or to a USB connector for attachment to a power port of the wireless streaming receiver. The USB conductor bundle extends along the USB cable segments and the hybrid cable segment to provide power from the USB slot on the television to the power port on the wireless streaming receiver.

18 Claims, 2 Drawing Sheets

(56) References Cited

U.S. PATENT DOCUMENTS

| | | | | |
|---|---|---|---|---|
| 7,542,299 B2* | 6/2009 | Chen | ................ | G06F 3/023 |
| | | | | 361/752 |
| 7,585,176 B2* | 9/2009 | Chen | ................ | H01R 31/005 |
| | | | | 439/222 |
| 7,591,673 B2* | 9/2009 | Chan | ................ | G06F 1/266 |
| | | | | 439/502 |
| 7,699,755 B2* | 4/2010 | Feldman | ............ | A63B 71/0009 |
| | | | | 482/8 |
| 7,727,117 B2* | 6/2010 | Feldman | ................ | A63B 24/00 |
| | | | | 482/8 |
| 8,059,417 B2* | 11/2011 | Cheng | ................ | G06F 3/0227 |
| | | | | 361/752 |
| 8,075,335 B2* | 12/2011 | Burke | ................ | H02G 11/02 |
| | | | | 439/501 |
| 8,308,507 B2* | 11/2012 | Lin | ................ | H01R 31/005 |
| | | | | 439/502 |
| 8,517,772 B2* | 8/2013 | Wu | ................ | H01R 31/06 |
| | | | | 439/638 |
| 8,535,090 B2* | 9/2013 | Su | ................ | H01R 27/02 |
| | | | | 439/502 |
| 8,608,505 B2* | 12/2013 | Mantay | ................ | H01R 31/02 |
| | | | | 439/505 |
| 9,515,442 B2* | 12/2016 | Cymerman | ............ | H01R 13/64 |
| 9,645,341 B2* | 5/2017 | Islam | ................ | G02B 6/4416 |
| 10,247,893 B1* | 4/2019 | Elkayam | ................ | H01R 25/00 |
| 2014/0004742 A1* | 1/2014 | Sheff | ................ | H01B 11/00 |
| | | | | 439/623 |
| 2017/0068061 A1* | 3/2017 | Yang | ................ | G02B 6/3882 |

\* cited by examiner

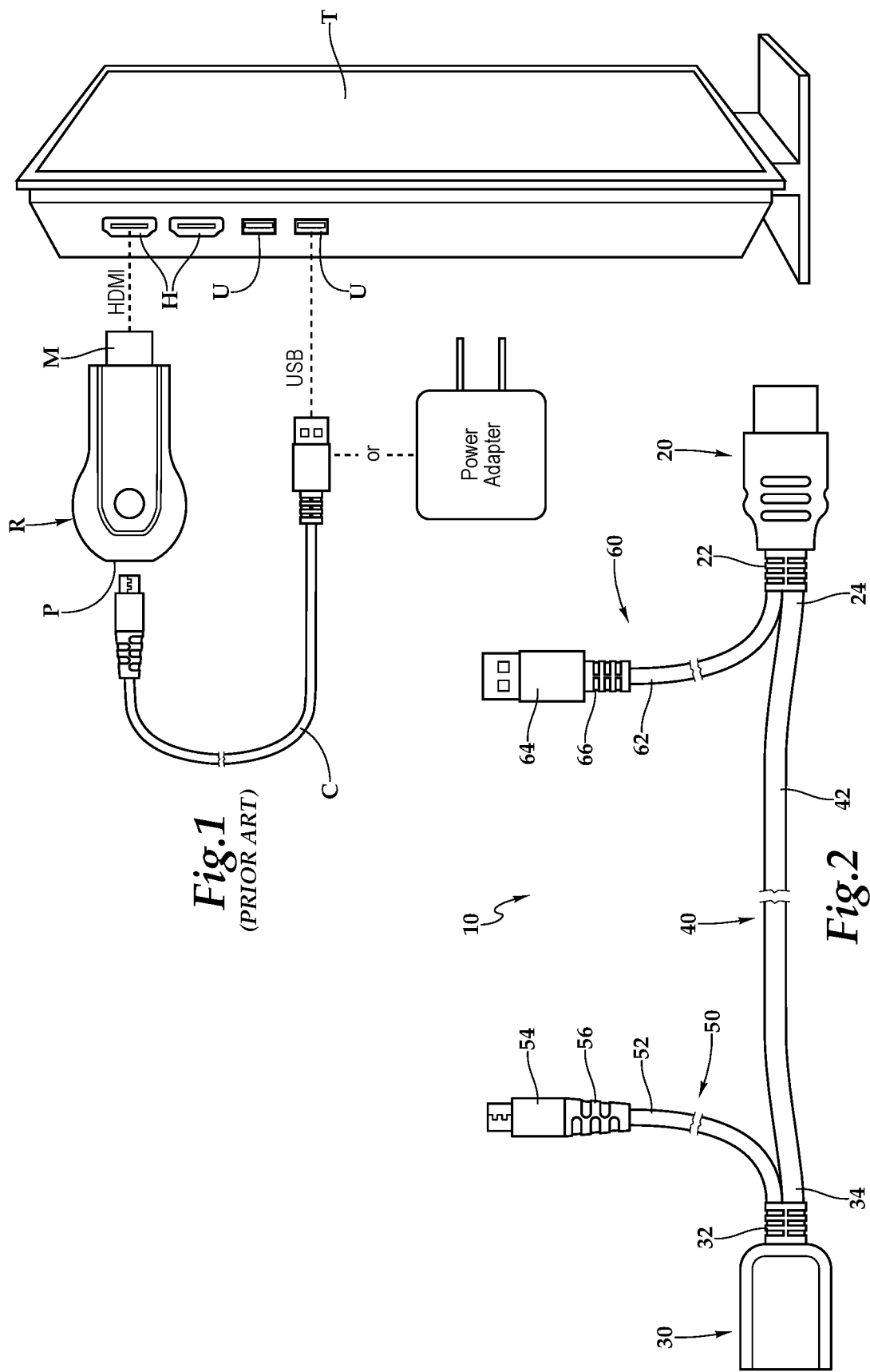

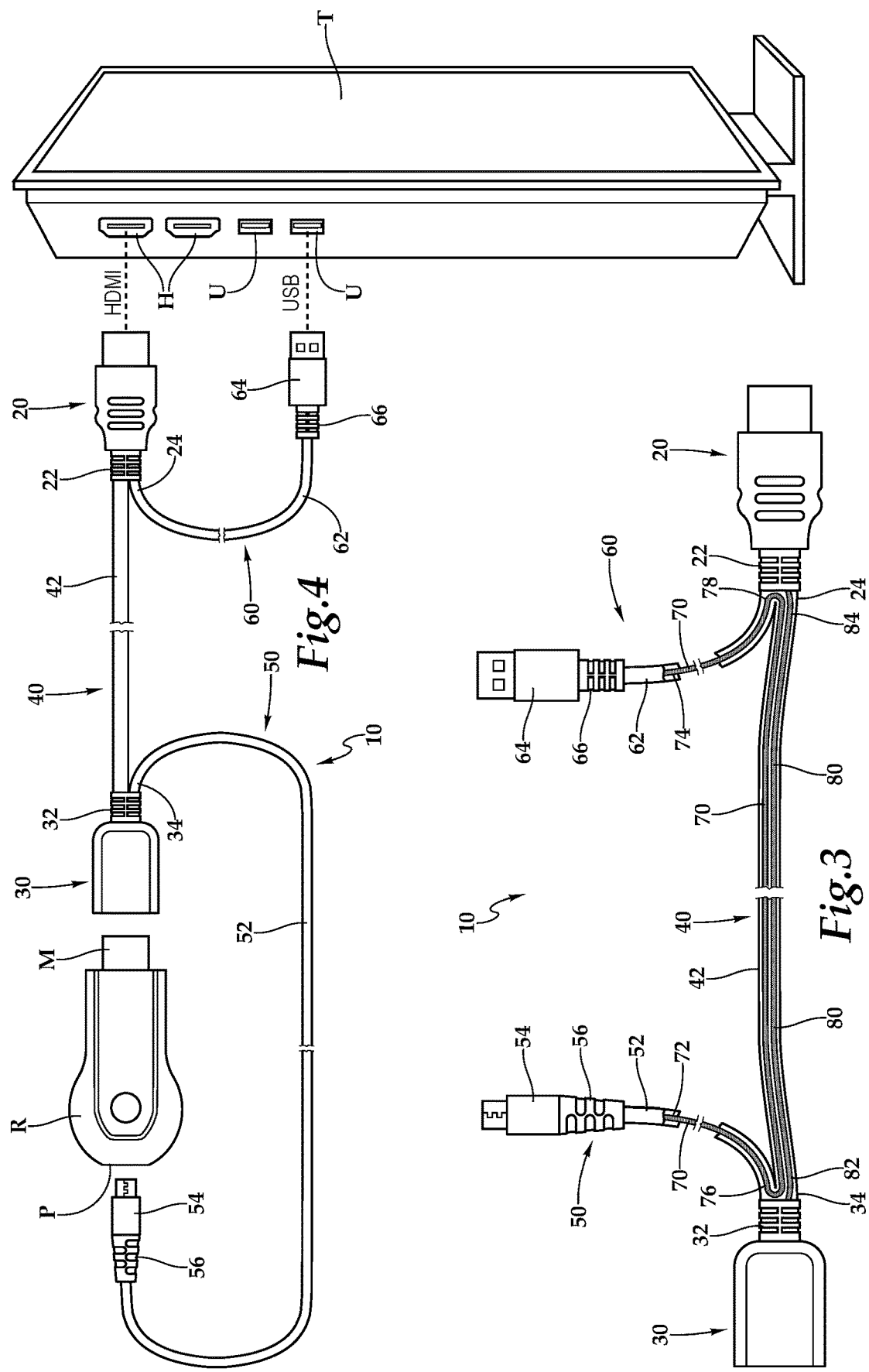

HDMI USB COMBINATION CORD

CROSS-REFERENCE TO RELATED APPLICATIONS

This application claims benefit under Title 35, United States Code § 119(e) of U.S. Provisional Application No. 62/792,645 filed on Jan. 15, 2019.

FIELD OF THE INVENTION

The following invention relates to electric cables for connecting electronics together. More particularly, this invention relates to cords, cables and other wiring which has connectors on ends thereof which can connect into slots and ports in various different electric devices, and in particular for connecting wireless streaming receivers to televisions such as through an HDMI slot on the television for signal transmission, and with power provided to the wireless streaming device along portions of the same cord from a USB or other power output slot on the television.

BACKGROUND OF THE INVENTION

Wireless streaming receivers are known in the prior art to allow video (and other sound or visible media) to be transferred to a television set from the source, such as a smart phone, or other computer or device with wireless transmitting capabilities. One typical such wireless streaming receiver is provided under the trademark CHROMECAST, by the Google company of Mountain View, Calif. Such wireless streaming receivers typically connect to a television set or other display through an HDMI slot configured to receive an HDMI male plug connector on the wireless streaming receiver.

One problem with such wireless streaming receivers is that they require power for effective operation. Such wireless streaming receivers are typically utilized for long periods of time and many sources of power are nearby the TV or other display, so that batteries are not a particularly desirable option for the wireless streaming receiver. Also, a wireless streaming receiver is typically a small lightweight device which can merely extend from the HDMI slot into which it is plugged on the TV or other display. Adding batteries to such a device would make it significantly heavier and bulkier, so that merely plugging into and extending from an HDMI slot would typically not be practical, and perhaps damage the HDMI slot or HDMI male connector of the wireless streaming receiver.

Prior art solutions for providing power to the wireless streaming receiver include having a power adapter plugged into a standard AC power service near the location where the TV or other display is located, and then routing a power cable, typically in the form of a USB cable, from the power adapter to a micro-USB connector port on the wireless streaming receiver. While this is effective, it requires a power adapter, takes up an additional available AC power port in the location adjacent to the TV/display (where such ports are often in short supply), and generally increases the clutter of wires needed to implement a device which would otherwise be "wireless" and have little or no wires.

A second solution is to utilize a USB cable with a micro-USB connector at one end which can couple to the micro-USB connector port on the wireless streaming receiver, and with this USB cable having a USB-A connector at an opposite end which can then be plugged into one of the USB slots on the TV/display. Such USB slots act as a source of power, and can also provide for data input. In this solution for the need to provide power to the wireless streaming receiver, the USB slots on the TV/display are not utilized for data input, but rather only for the power available through the USB slots. Such a solution still requires that this USB cable be run from the USB slot on the TV/display to the micro-USB connector port on the wireless streaming receiver. Hence, while some of the wiring clutter is avoided, and a wall receptacle and power adapter are not required, still a less than optimal solution is provided.

Wireless streaming receivers typically extend at least a couple of inches away from the HDMI slot on the TV/display. While the wireless streaming receiver is relatively lightweight and can have the gravity load associated therewith carried by the HDMI slot, typically without problems, adding a USB cable connected through the micro-USB connector port on a rear of the wireless streaming receiver (for typical wireless streaming receiver configurations) causes the weight of this USB cable to be carried by the end of the wireless gaming receiver, so that a relatively high torque is applied at an interface between the HDMI male connector and one of the HDMI slots on the TV/display. Furthermore, if this USB cable is snagged by a passing individual or other items, it can further apply a load to the wireless streaming receiver which could break the wireless receiver or damage the HDMI slot into which the wireless streaming receiver is attached on the TV/display. Accordingly, an opportunity exists to improve the delivery methodology and apparatus by which power is delivered to a wireless streaming receiver or similar device attached to a TV or other display.

SUMMARY OF THE INVENTION

With this invention, an HDMI USB combination cord (hereafter "combo cord") is provided which avoids some of the drawbacks of the prior art, both minimizing wiring clutter and potential for damage to the wireless streaming receiver and/or HDMI slot (and/or USB slot) on the TV, while still allowing for power to be supplied to the wireless streaming receiver from a USB slot on the TV/display. The combo cord is interposed between the wireless streaming receiver and the HDMI slot (or other appropriate signal input slot) on the TV/display. This combo cord includes an HDMI male connector which can connect into one of the HDMI slots. This HDMI male connector has a strain relief which surrounds a junction box through which both an HDMI conductor bundle passes and also through which a USB conductor bundle passes both in and out.

Two elongate flexible conduits extend from this strain relief junction at the HDMI male connector. First, a hybrid cable segment extends away from this junction and includes both the HDMI conductor bundle and the USB conductor bundle therein. Second, a first USB cable segment extends out of this HDMI male strain relief junction box and extends to a USB-A connector (or other connector), with a USB conductor bundle inside the first USB cable segment continuous with the USB conductor bundle that is within the hybrid cable segment.

In use, the HDMI male connector is connected to one of the HDMI slots on the TV/display. The USB-A connector at the end of the first USB cable segment is connected to one of the USB slots on the TV/display. The first USB cable segment can have a length matching a distance between HDMI slot and USB slots for the TV/display. Such a length can be pre-selected so the different connectors according to this invention are supplied to work specifically with particular TV/displays, or different sizes can be provided, such as some with a longer length of first USB cable segments and some with somewhat shorter lengths of first USB cable segments, so that a user can select a connector having the desired length of first USB cable segment to work with the TV/display which the user would typically already possess or intends to use.

The hybrid cable segment extends to a second end where it enters a strain relief junction box coupled to an HDMI female connector. This strain relief junction box at the second end of the hybrid cable segment has both the hybrid cable segment passing thereinto, as well as a second USB cable segment extending therefrom and extending to a micro-USB connector, and containing the USB conductor bundle from the hybrid cable segment and from the first USB cable segment. The length of this second USB cable segment is preferably just enough to extend from the HDMI male connector port at one end of the wireless streaming receiver to the micro-USB connector port or the wireless streaming receiver which is typically at the other end of the wireless streaming receiver, but could be somewhere else on the wireless streaming receiver. In this way, the HDMI male connector port can fit into the HDMI female connector of the combo cord of this invention, while the micro-USB connector at the end of the second USB cable segment reaches from the strain relief junction box at the second end of the combo cord to the micro-USB connector which can fit into the micro-USB connector port also located on the wireless streaming receiver. This second USB cable segment is thus of a very short length (as short as just a couple of inches and typically no more than six to twelve inches) and unlikely to be snagged by passing objects or to provide significant wiring clutter.

In a typical installation, the combo cord has its hybrid cable segment extending from the HDMI male connector fitting into one of the HDMI slots on the TV/display and then angling downward due to gravity loads associated with the weight of the wireless streaming receiver and the hybrid cable segment, as well as the relatively small second USB cable segment. Thus, the wireless streaming receiver is dangling downwardly and adjacent to and below (and typically also behind) a portion of the TV/display where the HDMI slots are located. This places the wireless streaming receiver close to the TV/display so that it does not stick out very far and is unlikely to be snagged by passing items. Also, should it be snagged, it is a dangling strand rather than a loop, so that it is unlikely to be grabbed and pulled. If it is grabbed and pulled, the forces which result are highly likely to be directly away from the TV/display so that the HDMI male connector connected into the HDMI slot on the TV/display would merely become unplugged, and no damage would likely ensue.

As with the first USB cable segment, the second USB cable segment can be provided on different connectors according to this invention with different lengths to accommodate spacing between HDMI male connectors and micro-USB connector ports on various different wireless streaming receivers. These different lengths could be matched to different wireless streaming receivers or could be provided in standard lengths for a user to select that which is most appropriate. As a further option for both the first USB cable segment and the second USB cable segment, these cable segments could be coiled, such as with a helical twisting form, so that they could remain compact when a shorter length is required, but can be extended somewhat when a greater length is needed, and so that a lesser number of different lengths would need it to be provided to accommodate different sizes of wireless streaming receivers and different distances between HDMI slot and USB slots on the TV/display. Furthermore, if desired, the hybrid cable segment between the first end and the second end could be coiled if desired to provide similar benefits to those described above.

Typically, the USB conductor bundle and the HDMI conductor bundle within the hybrid cable segment are made up of multiple different elongate conductors which are then each provided with their own insulating jacket, as well as an outer jacket for each bundle. In this way, shorting between the conducting elements within the two bundles (HDMI bundle and USB bundle) is avoided. Also, a final insulating outer jacket is preferably provided on an exterior of the hybrid cable segment, so that the hybrid cable segment has the appearance of a single cable (which in fact is), but which contains both an HDMI conductive bundle and a USB conductive bundle within the outer jacket.

While the invention has been described above in an embodiment where it facilitates connecting of a wireless streaming receiver to a TV/display, the combo cord of this invention could also be utilized in other instances where and HDMI utilizing device also needs power and where the HDMI utilizing device connects to an item which also has USB slots thereon. Furthermore, while this invention has been disclosed in the context of devices which need to connect to an HDMI port and also to have a connection between a micro-USB connector port and a USB slot, this cable could be modified so that the HDMI connectors and/or USB connectors could be changed into some other forms of connectors (and associated conductors). These other forms of connectors could be according to various different standards and could be for data transmission, power transmission, or a combination of both data and power transmission. While the HDMI bundle of conductors and USB conductor bundle are typically preferably kept entirely separate from each other, it is conceivable that various different conductors within these bundles could be shared in embodiments of this invention. For instance, if one of the conductors within the USB conductor bundle is a ground conductor, and if one of the conductors within the HDMI bundle is a ground conductor, to provide common ground and save material a single ground conductor wire could split at the first junction and also split at the second junction, so that only a single ground conductor wire would pass along the hybrid cable segment, which would provide ground for both the HDMI bundle and the USB connector bundle extending from each end of the combo connector of this invention.

OBJECTS OF THE INVENTION

Accordingly, a primary object of the present invention is to provide a combination cord which can simultaneously facilitate attachment of a wireless streaming receiver or other signal input source to an HDMI slot or other signal input on a television, while also allowing portions of the same cord to supply power from a USB (or other power output) slot on the television to a power port on the wireless streaming receiver, to supply power for operation of the wireless streaming receiver or other signal input source.

Another object of the present invention is to provide a combination cord which allows flexible attachment of a wireless streaming receiver to an HDMI slot on a television, minimizing lateral forces between an HDMI male plug on a wireless streaming receiver and an HDMI slot on a television or other video monitor.

Another object to the present invention is to minimize wiring clutter adjacent to a television.

Another object of the present invention is to minimize propensity to have wiring associated with devices plugged into slots on a television becoming snagged by persons or objects passing by the television.

Another object to the present invention is to minimize potential for a wireless streaming receiver to become disconnected from a television inadvertently.

Another object to the present invention is to minimize propensity for damage to a wireless streaming receiver and/or HDMI slot on a television due to excessive loads between the wireless streaming receiver and the television.

Another object to the present invention is to provide a method for connecting a wireless streaming receiver or other signal input source to an HDMI slot or other signal input source on a television.

Other further objects of the present invention will become apparent from a careful reading of the included drawing figures, the claims and detailed description of the invention.

BRIEF DESCRIPTION OF THE DRAWINGS

FIG. 1 is a perspective view of a television and wireless streaming receiver showing how, in the prior art, the wireless streaming receiver can attach to an HDMI slot in the television, and further showing how it is known in the prior art to power the wireless streaming receiver with a USB cable that receives power from a USB slot on the television.

FIG. 2 is a top plan view of the combination cord of this invention usable to simultaneously connect a wireless streaming receiver or other signal input source into an HDMI slot or other signal input slot on a television, and to also supply power from a power output slot on the television to a power input port on the signal input source.

FIG. 3 is a sectional top plan view of that which is shown in FIG. 2, and revealing how internal conductor bundles are routed within a sheath of the combination cord and other portions of the combination cord to provide for input signal transmission and power transmission therethrough.

FIG. 4 is a perspective view illustrating how the combination cord of FIGS. 2 and 3 can be used to connect a wireless streaming receiver or other input source to an HDMI (or other signal input) slot on a television, and also supply power from a USB (or other power output) slot on the television to the wireless streaming receiver or other signal input source.

DESCRIPTION OF THE PREFERRED EMBODIMENT

Referring to the drawings, wherein like reference numerals represent like parts throughout the various drawing figures, reference numeral 10 is directed to a combination cord (FIGS. 2-4) for carrying both an HDMI (High Definition Multimedia Interface) signal (or other image display signal) and also supplying power, such as along at least one conductor associated with a USB (Universal Serial Bus) cable bundle. The combination cable allows for a wireless streaming receiver R or other video input source to be plugged into an HDMI slot H in a television T in a unique and beneficial manner, and while also supplying power to the wireless streaming receiver R through a power port P thereof, with the power originating in a USB slot U of the television T, by routing of power along portions of the combination cord 10. The combination cord 10 thus both provides power to the wireless streaming receiver R and also provides for a signal pathway to be coupled to the television T, and minimizes strain that would otherwise be present between an HDMI male plug M of the wireless streaming receiver R and the HDMI slot H of the television T.

In essence, and with particular reference to FIGS. 2 and 3, basic details of the combination cord 10 are described, according to one embodiment. The combination cord 10 includes an HDMI male connector 20 spaced from an HDMI female connector 30 by a hybrid cable segment 40. A first USB cable segment 50 extends laterally from one end of this hybrid cable segment 40. A second USB cable segment 60 extends laterally from a second end of the hybrid cable segment 40. Each of these USB cable segments 50, 60 terminate at connectors such as a micro-USB connector 54 and a USB-A connector 64. A USB conductor bundle 70 extends along the first USB cable segment 50, along the second USB cable segment 60 and along the hybrid cable segment 40, so that the micro-USB connector 54 and USB-A connector 64 are electrically coupled to each other. An HDMI conductor bundle 80 extends between the HDMI male connector 20 and HDMI female connector 30, along the hybrid cable segment 40. Thus, the hybrid cable segment 40 carries both USB conductor bundle 70 and the HDMI conductor bundle 80.

With particular reference to FIG. 1, details of prior art methods and cables for connecting wireless streaming receivers R to televisions T are described. The wireless streaming receiver R defines one form of signal input device from which a signal can be fed via an HDMI male plug M (or other connector) through an HDMI slot H (or other input) on the television T (or other display device), to interface with circuitry within the television T for display thereon. Such wireless receivers R also require power. It is known to supply such power along a USB cable C with one end of such a USB cable C coupled to a USB slot U on the television T and the other end of the USB cable C coupled through an appropriate connector to a power port P on the wireless streaming receiver R. As an alternative, the USB cable C can attach to a power adapter which can be plugged into wall power separate from the television T. As described in detail above, such a prior art system can have various drawbacks. An alternative exemplary arrangement utilizing the combination cord 10 of this invention is illustrated in FIG. 4, and described in detail below, according to one embodiment.

More specifically, and with particular reference to FIGS. 2 and 3, details of the combination cord 10 are described, according to one embodiment disclosed herein. The combination cord 10 includes an HDMI male connector 20 as one form of a first signal connector configured to fit within an HDMI slot H on the television T. This HDMI male connector 20 typically includes a strain relief 22 on an end of the HDMI male connector 20 opposite a male plug thereof, and at a first end of the hybrid cable segment 40. The strain relief 22 surrounds a junction housing 24 also referred to as a first junction, between the HDMI male connector 20 and the hybrid cable segment 40.

The hybrid cable segment 40 extends away from the HDMI male connector 20 to an HDMI female connector 30 as one form of a second signal connector. At the transition between the hybrid cable segment 40 and the HDMI female connector 30, a strain relief 32 is provided surrounding a junction housing 34, which can also be referred to as a second junction. The hybrid cable segment 40 includes an outer sheath 42 which encloses multiple conductors therein. The hybrid cable segment 40 is flexible and can have a variety of different lengths. A length of the hybrid cable segment 40 defines a distance between the HDMI male connector 20 and the HDMI female connector 30, where the wireless streaming receiver R is attached to the HDMI female connector 30 through the HDMI male plug M (FIG. 1) on the wireless streaming receiver R. In one embodiment, this hybrid cable segment 40 is quite short, just long enough so that it can conveniently rotate 90°, such as under gravity loads acting on the wireless streaming receiver R, and so that the HDMI male connector 20 can be oriented extending horizontally while the HDMI female connector 30 can be oriented extending vertically.

Within an interior of the outer sheath 42 of the hybrid cable segment 40, a USB conductor bundle 70 and HDMI conductor bundle 80 both extend. Each of these conductor bundles 70, 80 (which include at least one wire or other conductor therein) are preferably surrounded by insulation separating the two conductor bundles 70, 80 from each other. As one conceivable option, only one of the conductors 70, 80 could be provided with insulation and still unwanted electrical conduction between the USB conductor bundle 70 and the HDMI connector bundle 80.

The HDMI conductor bundle 80 extends to a first end 82 adjacent to the HDMI female connector 30 and a second end 84 adjacent to the HDMI male connector 20. This HDMI bundle 80 could conceivably be as few as a single conductor, but typically includes multiple conductors wired into the HDMI connectors 20, 30 appropriately for signal transfer therebetween. The USB conductor bundle 70, which could also be conceivably as few as a single conductor, not only extends along the hybrid cable segment 40, but also extends along the first USB cable segment 50 and second USB cable segment 60 which extend laterally from the ends (or other portions) of the hybrid cable segment 40.

With continuing reference to FIGS. 2 and 3, details of the first USB cable segment 50 and second USB cable segment 60 are described, according to this example. The first USB cable segment 50 extends from the second junction defined by the junction housing 34 adjacent to the HDMI female connector 30. This first USB cable segment 50 includes an outer cover 52 in the most preferred embodiment, with the USB conductor bundle 70 contained therein (either with insulation therebetween, or with the outer cover being the insulation). This first USB cable segment 50 terminates at a micro-USB connector 54 through a strain relief 56. Other forms of connectors could alternatively be utilized, but typically the wireless streaming receiver R has a power port P configured to receive such a micro-USB connector 54 to supply power thereto. A length of the first USB cable segment 50 is generally similar to a length required to pass from one end of the wireless streaming receiver R to the other end of the wireless streaming receiver R. This is because the HDMI male plug M of the wireless streaming receiver R is typically on an opposite end of the wireless stream receiver R from the power port P. The first USB cable segment 50 merely needs to be long enough so that it can extend from the second junction adjacent to the HDMI female connector 30 which is near the HDMI male plug M of the wireless streaming receiver R, around to the power port P at the opposite end of the wireless streaming receiver R. As an example, if the wireless remote receiver R houses the power port P approximately two inches away from the HDMI male plug M, the first USB cable segment 50 might be approximately four inches long to facilitate extending this distance and to facilitate gradual curves so that this first USB cable segment 50 can conveniently span this distance and have sufficient slack for attaching and detaching the micro-USB connector 54 to the power port P on the wireless streaming receiver R.

The second USB cable segment 60 extends from the first junction adjacent to the HDMI male connector 20 to a USB-A connector, or other USB connector. An outer cover 62 preferably extends along the second USB cable segment 60, and surrounds the USB connector bundle 70 (either with insulation therebetween, or with the outer cover being the insulation). The USB-A connector 64 is attached to the second USB cable segment 60 via a strain relief 66 in one embodiment. The USB-A connector 64 is selected as it is typically the connector required to attach to a USB slot U on a television T. In alternative embodiments, other forms of connectors could be provided at this distal end of the second USB cable segment 60.

USB slots and cables are configured to carry power, typically along with some form of signal. In this use for the combination cord 10, only the power transfer facilitating portions of the second USB cable segment 60 (in the first USB cable segment 50) are utilized. The USB conductor bundle 70 is configured to transmit this electric power from the USB slot U on the television T, along the second USB cable segment 60, along the hybrid cable segment 40, and then along the first USB cable segment 50 to the micro-USB connector 54 where it can attach to the power port P on the wireless streaming receiver R which is also plugged into the HDMI female connector 30 through the HDMI male plug M. In such a configuration, the combination cord 10 allows for signal transfer and powering of the wireless streaming receiver R through this combination cord 10.

The USB conductor bundle 70 has a micro-USB end 72 opposite a USB-A end 74 which are at the distal ends of the first USB cable segment 50 and second USB cable segment 60. This USB conductor bundle 70 also features a first bend 76 at the second junction and a second bend 78 at the first junction. These bends 76, 78 cause the USB conductor bundle 70 to transition between passing along the hybrid cable 40 to pass along the USB cable segments 50, 60. The strain reliefs 22, 32 adjacent to the connectors 20, 30 are configured so that the USB cable segments 50, 60 extend out of these strain reliefs 22, 32 typically generally parallel with ends of the hybrid cable segment 40 adjacent to these first and second junctions. Such a configuration is conveniently handled by many strain reliefs forming machines and thus facilitates convenient manufacture.

The bends 76, 78 allow the USB connector bundle 70 to make an approximately 180° (typically slightly less) turn at each of the junctions within the junction housings 24, 34, so that the USB conductor bundle 70 can pass along the hybrid cable segment 40 and out to the micro-USB end 72 at the first USB cable segment 50 and out to the USB-A end at the second USB cable segment 60. In some embodiments, the USB cable segments 50, 60 (or at least one of them) could extend more laterally and perpendicularly from the hybrid cable segment 40, so that the bends 76, 78 might be closer to 90° than to 180°. A length of the second USB cable segment 60 is preferably sufficiently long to span a common distance provided between HDMI slots H and USB slots U on typical televisions T. In this way, excessive slack in the second USB cable segment 60 is minimized.

As an option, the combination cord 10 can be provided in a variety of different sizes with different lengths of hybrid cable segments 40 and with different lengths of first USB cable segments 50 and second USB cable segments 60. Various lengths can accommodate the slot locations on various different televisions T, and the sizes of different wireless streaming receivers R and other signal input devices, and also provide options for where the wireless streaming receiver R will be located relative to an HDMI slot, based on the length of the hybrid cable segment 40. For instance, a user might measure slot spacings on the user's television T, and measure a size of the wireless streaming receiver R, and then purchase an appropriately sized combination cord 10 that would significantly minimize lengths of wiring associated with the combination cord 10. As another alternative, a database of different televisions T and different wireless streaming receivers R could be prepared so the user would merely identify the make and model of the television T and the make and model of the wireless streaming receiver R and the database would output the appropriate combination cord 10 to be used to provide a minimum of excessive wires. As a further alternative option, and to allow for accommodating different size requirements, the first USB cable segment 50 and/or second USB cable segment 60 could be a helically curving and resilient cable segment which has the ability to expand and contract in length, so that slack in the wire and can be minimized.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. An electrically conductive connector, comprising combination:
    a hybrid cable segment including a USB conductor bundle therein and an HDMI conductor bundle therein, said hybrid cable segment extending between a first end and a second end opposite said first end;
    a first junction at said first end of said hybrid cable, said first junction having a first HDMI connector coupled thereto and a first USB cable segment extending therefrom and leading to a first USB connector;
    a second junction at said second end of said hybrid cable, said second junction having a second HDMI connector coupled thereto and a second USB cable segment extending therefrom to a second USB connector; and
    wherein a wireless streaming receiver is interposed between said second HDMI connector and said second USB connector on said second USB cable segment.

2. The connector of claim 1 wherein said first junction and said second junction are configured to include strain reliefs.

3. The connector of claim 1 wherein said second USB cable segment is shorter than said first USB cable segment.

4. The connector of claim 1 wherein said second HDMI connector is electrically connected to a first end of said HDMI conductor bundle and said first HDMI connector is electrically connected to a second end of said HDMI conductor bundle, said first end of said HDMI conductor bundle opposite said second end of said HDMI conductor bundle.

5. The connector of claim 1 wherein said USB conductor bundle has a second end coupled to a micro-USB connector on an end of said second USB cable segment and a first end coupled to a USB-A connector on an end of said first USB cable segment.

6. The connector of claim 5 wherein said USB conductor bundle has a first bend at said second junction and a second bend at said first junction, said first bend and said second bend each closer to 180° than to 0°.

7. The connector of claim 6 wherein at least one of said first bend and said second bend are closer to 180° than to 90°.

8. A combination HDMI and USB cord, comprising in combination:
    a first HDMI connector;
    a second HDMI connector;
    a first USB connector;
    a second USB connector;
    at least one USB conductor extending between said first USB connector and said second USB connector;
    at least one HDMI conductor extending between said first HDMI connector and said second HDMI connector;
    a hybrid cable segment including both said at least one USB conductor and said at least one HDMI conductor routed along at least a portion thereof; and
    wherein a wireless streaming receiver is interposed between said second HDMI connector and said second USB connector on said second USB cable segment.

9. The cord of claim 8 wherein said hybrid cable includes an outer sheath, said USB conductor and said HDMI conductor located inside said outer sheath.

10. The cord of claim 9 wherein insulation surrounds at least one of said USB conductor and said USB conductor.

11. The cord of claim 9 wherein a first USB cable segment extends from a first junction between said hybrid cable and said first HDMI connector, and wherein a second USB cable segment extends from a second junction between said hybrid cable and said second HDMI connector.

12. The cord of claim 11 wherein bends in said USB conductor are located at said first junction between said hybrid cable and said first HDMI connector and at said second junction between said hybrid cable and said second HDMI connector.

13. The cord of claim 12 wherein each of said junctions includes a strain relief thereon, and wherein each of said bends is greater than 90°.

14. The cord of claim 8 wherein said first HDMI connector is a male HDMI connector, said second HDMI connector is a female HDMI connector, said first USB connector is a USB-A connector, and said second USB connector is a micro-USB connector.

15. A method for connecting a wireless streaming receiver to a signal input port of a television and supplying power to the wireless streaming receiver from a power outlet of the television, the method including the steps of:
    attaching a combination HDMI and USB cord to the signal input port on the television through a first HDMI connector of the cord, the cord having a second HDMI connector spaced from the first HDMI connector, and with the cord also having a first USB connector and a second USB connector, the cord including at least one USB conductor extending between the first USB connector and the second USB connector and at least one signal input conductor extending between the first HDMI connector and the second HDMI connector, and with a hybrid cable segment including both the at least one USB conductor and the at least one signal input conductor both routed along at least a portion thereof;

coupling an HDMI male plug of the wireless streaming receiver to the second HDMI connector;

connecting the first USB connector to a USB port on the television; and further connecting the second USB connector to a power port on the wireless streaming receiver.

16. The method of claim 15 wherein said at least one USB conductor extends along the hybrid cable segment through junctions at each end of the hybrid cable segment, and along a first USB cable segment extending from a first one of the junctions and along a second USB cable segment extending from a second one of the junctions.

17. The method of claim 16 wherein the junctions include strain reliefs securing both ends of the hybrid cable segment and one end of each of the USB cable segments.

18. The method of claim 17 wherein the at least one USB conductor includes bends within each of said junctions, each of said bends being greater than 90°.

\* \* \* \* \*